US008868866B2

(12) United States Patent
Hoelsaeter

(10) Patent No.: US 8,868,866 B2
(45) Date of Patent: Oct. 21, 2014

(54) CONFIGURABLE TAPE LOADER WITH INTERNAL HARD-DISK

(75) Inventor: Håvard Hoelsaeter, Oslo (NO)

(73) Assignee: Tandberg Data ASA, Oslo (NO)

(*) Notice: Subject to any disclaimer, the term of this patent is extended or adjusted under 35 U.S.C. 154(b) by 158 days.

(21) Appl. No.: 13/532,109

(22) Filed: Jun. 25, 2012

(65) Prior Publication Data

US 2012/0262811 A1    Oct. 18, 2012

Related U.S. Application Data

(62) Division of application No. 10/976,141, filed on Oct. 28, 2004, now abandoned.

(60) Provisional application No. 60/516,543, filed on Oct. 31, 2003.

(51) Int. Cl.
| G06F 7/22 | (2006.01) |
| G06F 11/16 | (2006.01) |
| G11B 5/86 | (2006.01) |
| G11B 15/68 | (2006.01) |
| G11B 33/12 | (2006.01) |
| G11B 25/04 | (2006.01) |

(52) U.S. Cl.
CPC ............ *G11B 33/128* (2013.01); *G11B 5/86* (2013.01); *G11B 15/68* (2013.01); *G11B 25/043* (2013.01); *G11B 15/6835* (2013.01); *G11B 15/683* (2013.01)
USPC .......................................... 711/163; 711/161

(58) Field of Classification Search
None
See application file for complete search history.

(56) References Cited

U.S. PATENT DOCUMENTS

| 4,802,035 | A | 1/1989 | Ohtsuka |
| 4,812,629 | A | 3/1989 | O'Neil et al. |
| 4,910,619 | A | 3/1990 | Suzuki et al. |
| 5,274,516 | A | 12/1993 | Kakuta et al. |
| 5,285,335 | A | 2/1994 | Sato |
| 5,303,214 | A | 4/1994 | Kulakowski |
| 5,508,859 | A | 4/1996 | Hu et al. |
| 5,604,873 | A | 2/1997 | Fite et al. |
| 5,781,368 | A | 7/1998 | Kotaki et al. |
| 5,940,629 | A | 8/1999 | Rikukawa et al. |
| 6,134,212 | A | 10/2000 | Pines et al. |
| 6,271,982 | B1 | 8/2001 | Helmick |
| 6,690,582 | B2 | 2/2004 | Sumida |
| 6,772,305 | B2 * | 8/2004 | Gold ............................ 711/162 |
| 6,785,786 | B1 * | 8/2004 | Gold et al. .................... 711/162 |

(Continued)

FOREIGN PATENT DOCUMENTS

| JP | 11145662 | 5/1999 |
| WO | 03067385 | 8/2003 |

*Primary Examiner* — Matthew Bradley
*Assistant Examiner* — Candice Rankin
(74) *Attorney, Agent, or Firm* — Schiff Hardin LLP

(57) ABSTRACT

A data archiving apparatus includes an autoloader for automated transfer of data tape cartridges between at least one tape drive and storage locations of at least one cartridge storage magazine. One or more hard disks is mounted within the autoloader apparatus. The hard disk is connected for data transfer between the hard disk and the tape drive so that data caching can be accomplished during the data archiving process. Interface controls for both the tape drive and the one or more hard disks is provided within the housing of the data archiving apparatus to permit simultaneous operation of the hard disk and the tape drive and for data transfer there between. The hard disks may be exchanged by a user to increase data storage capacity.

2 Claims, 3 Drawing Sheets

(56) References Cited

U.S. PATENT DOCUMENTS

| | | |
|---|---|---|
| 6,856,508 B2 | 2/2005 | Rabinovitz |
| 6,866,581 B2 | 3/2005 | Martinek et al. |
| 6,957,291 B2 * | 10/2005 | Moon et al. .................. 710/302 |
| 7,036,132 B1 | 4/2006 | Coffin et al. |
| 8,553,344 B2 * | 10/2013 | Thompson et al. ............. 360/15 |
| 2002/0057513 A1 * | 5/2002 | Porter et al. .................... 360/69 |
| 2002/0144044 A1 * | 10/2002 | Moon et al. .................. 710/302 |
| 2002/0144048 A1 * | 10/2002 | Bolt ................................. 711/4 |
| 2003/0063408 A1 | 4/2003 | Beeston et al. |
| 2003/0086202 A1 | 5/2003 | Hoelsaeter |
| 2005/0057847 A1 * | 3/2005 | Armagost et al. .............. 360/92 |

\* cited by examiner

CONFIGURABLE TAPE LOADER WITH INTERNAL HARD-DISK

CROSS-REFERENCE TO RELATED APPLICATIONS

This application claims the benefit of U.S. Provisional Patent Application Ser. No. 60/516,543, filed Oct. 31, 2003, which is incorporated herein by reference.

This application is a divisional application of U.S. patent application Ser. No. 10/976,141, filed Oct. 28, 2004, now abandoned which is incorporated herein by reference.

BACKGROUND OF THE INVENTION

1. Field of the Invention

The present invention relates generally to a taped-based data storage system, and, in particular, to an automated tape loader and tape drive for data back up.

2. Description of the Related Art

Computer systems and computer based systems require data storage systems for storage of the computer data. To insure against loss of the data, data archiving systems have been developed. A common data archiving system includes one or more tape drives which utilize removable tape cartridges for recording and playback of the computer data. The tape cartridges have the benefit of large storage capacity and the ability to change cartridges to extend the storage capacity to a virtually infinite amount. However, manually operated tape drives require the presence of skilled personnel to exchange the tapes on a regular schedule.

So-called autoloaders have been developed which automate the exchange of the tape cartridges into and out of the tape drives. These autoloaders move tapes generally one at a time from storage magazines, which hold a number and store of tape cartridges, to the tape drive and, upon completion of recording and/or playback from the tape drive, back to a storage location in the storage magazine. These autoloaders are generally connected into a computer system or computer network and are provided with an appropriate number of tape cartridges in the storage magazines. Autoloaders having a single drive record the data onto tapes one at a time in the drives. Autoloaders systems having multiple tape drives permit data to be provided simultaneously to the multiple drives nearly simultaneously, thereby reducing the data backup time.

However, tape backup systems still suffer from the disadvantage that the transfer rate for the data to the tape cartridge or from the tape cartridge is limited compared to the transfer rate of data within most other components in the computer system or network. The result is that data backup and/or data archiving generally must be performed during downtimes for the computer system. For example, for a business that shuts down each day, the data backup is generally performed while the business is shut down. However, many businesses operate on a 24 hour schedule so that there is no ideal time for performing data backup. Even for those businesses which perform the data backup for the computer system during the hours when the business is shut down, failure of the computer system during working hours may result in the loss of some or all of a day's data since the failure may result in a complete loss of data since the last backup.

It would be a benefit if a data archiving system were provided which possesses enough speed to perform the backup during the full operation of the computer system or network. It would also be an advantage if a data archiving system were provided with a high data transfer rate and a small backup window.

SUMMARY OF THE INVENTION

The present invention provides a data backup and/or archiving system having one or more hard disks in the data archiving apparatus with one or more tape drives and an autoloader for loading tape cartridges into the tape drives. By transfer of the data to the hard disks and then transfer of the data from the hard disks to the tape or visa versa, the data transfer rate is increased significantly over that of a tape loader and tape drive alone. As such, the backup window possible with the present tape loader is significantly reduced. The present tape loader with one or more internal hard disks maintains the benefits of tape backup while simultaneously providing the benefits of hard disk data backup.

DETAILED DESCRIPTION OF THE PREFERRED EMBODIMENTS

Figure 1:
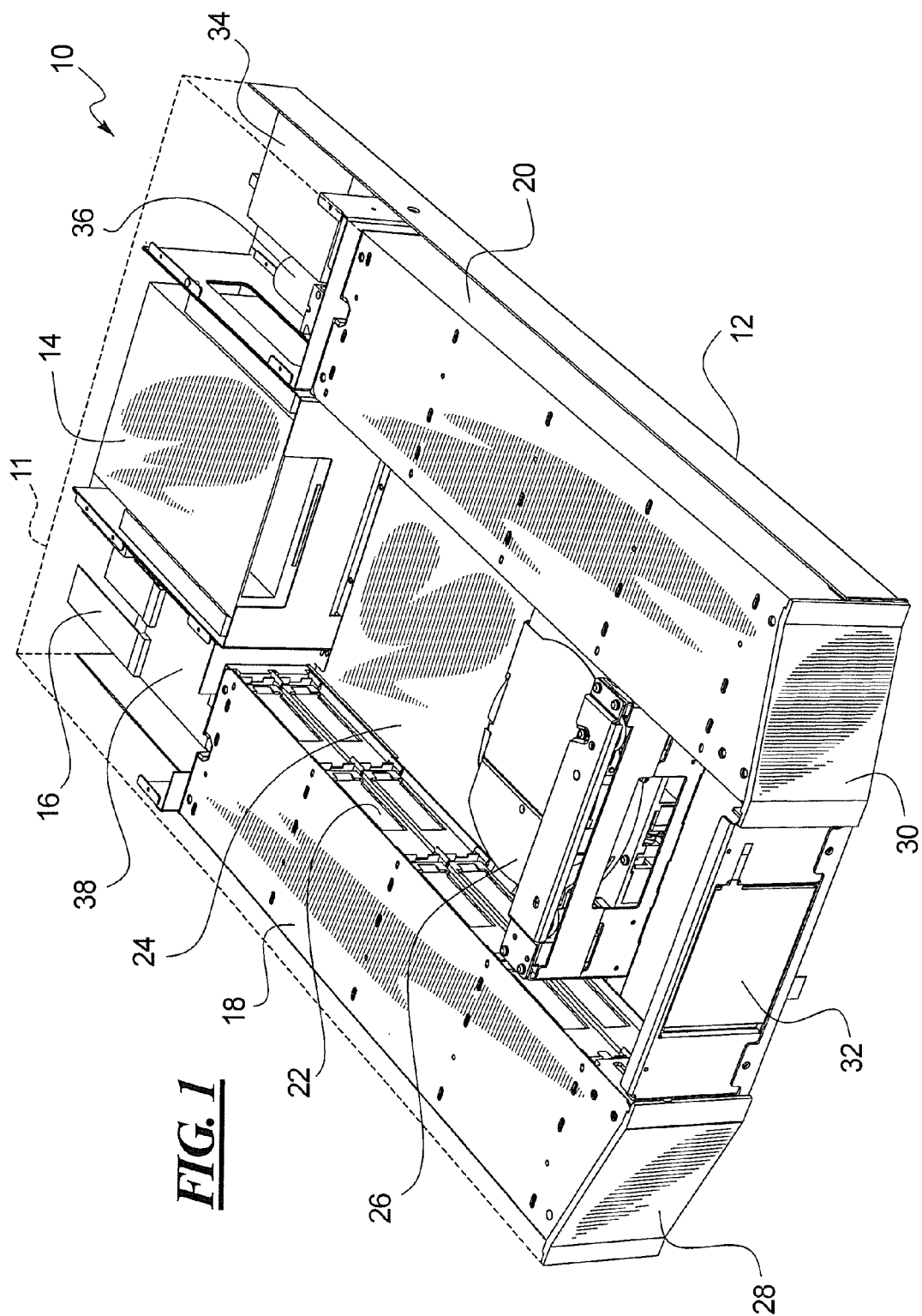
FIG. 1 is a perspective view showing a autoloader of the present invention with its housing removed and including an automated loading tape apparatus for a tape drive as well as an internal hard disk within the autoloader unit according to the principles of the present invention.

With reference to FIG. 1, an autoloader 10 includes a frame 12 which is normally encased within a housing 11 (as shown in dotted outline). On the frame 12 is provided a tape drive 14 for recording data onto and reading data from tape cartridges. The tape drive 14 is connected by a host cable 16 to a computer system or computer network so that the data of a computer system or computer network may be transferred over the host cable 16 to and from the tape drive 14. The autoloader 10 also includes, in the illustrated example, a pair of tape storage magazines 18 and 20 which each have a plurality of storage slots in which tape cartridges 22 are stored. In the illustration, each of the tape storage magazines 18 and 20 hold eight cartridges 22 in two rows of four each. Other arrangements of tape storage magazines are of course encompassed within the scope of the present invention including the provision of only one tape storage magazine or more than two tape storage magazines. It is of course within the scope of this invention that tape storage magazines having different numbers and arrangements of storage slots may also be provided including tape storage magazines having only a single row of slots or tape storage magazines having three or more rows.

The two tape storage magazines 18 or 20 are mounted on the frame 12 with a transfer space 24 defined therebetween. In the transfer space 24 is mounted a robotic cartridge shuttle apparatus 26. The cartridge shuttle 26 is automatically operable to move within the transfer space 24 so as to access each one of the tape cartridges individually in the two tape storage magazines and transfer each one of the tape cartridges in turn to the tape drive 24. The cartridge shuttle 26 also removes the tape cartridges 22 from the tape drive 14 and transfers the tape cartridges back to a storage slot in the tape storage magazines 18 or 20. The cartridge shuttle 26 moves linearly within the transfer space 24 and, in a preferred embodiment, rotates the tape cartridges 22 to reorient the cartridges 22 for mounting in the tape drive 14 and for storage in the storage slots of the storage magazines 18 and 20. The cartridge shuttle 26 also includes a vertical elevator mechanism for access to the storage slots disposed vertically above one another in the tape storage magazines 18 and 20. Other arrangements of tape cartridge shuttles and cartridge transfer mechanisms are also encompassed within the scope of the present invention, the illustrated example being only for purposes of explanation in understanding the scope of this invention.

The tape storage magazines 18 and 20 are each preferably removable from the frame 12 at front portions 28 and 30, respectively, such as by opening an access door in the housing (not shown). In this way, the tape storage magazines 18 and 20 may be removed from the autoloader apparatus, tapes mounted therein or exchanged for other tapes, and the storage magazines 18 and 20 returned to their positions on the frame 12 for continued operation of the autoloader apparatus 10. Thus, the present autoloader has a large data storage capacity since it has a number of tape cartridges provided therein and an even greater number that can be provided. The ability to exchange the tape cartridges within the autoloader extends the storage capacity of the present apparatus by many times. It is foreseeable that the tape storage magazines 18 and 20 may be exchangeable for other already filled tape storage magazines to increase the ease of use and storage capacity even more.

The autoloader 10 of the illustrated example includes a front panel display 32 which provides status information to the user and operational controls for operation of the automated data archiving system. In addition to, or instead of the front panel display 32, a mail slot may be provided for transfer for tapes one at a time into and out of the autoloader apparatus without requiring removal of the entire tape storage magazines 18 or 20. The primary control of the autoloader is via software, for example, through a user interface running on the computer system or network to which the autoloader is connected.

In the present autoloader 10, a power supply 34 is provided at the back along side the tape drive 14. The power supply 34 is connected to line power and/or to a battery backup system and provides operating power to the devices within the autoloader apparatus. Adjacent the power supply 34 is included a motor 36 which moves the cartridge shuttle 26 within the transfer space 24. Other motors and drive assemblies are provided for affecting movement of the cartridge shuttle 26, as will be appreciated by those of skill in this art.

In the space on the frame 12 at the opposite side of the tape drive 14 is provided one or more printed circuit boards 38. The printed circuit board 38 includes the drive and control circuitry for operation of the tape drive 14, motor 36, cartridge shuttle 26 and other operational elements of the present autoloader 10, for example, using the operating software. The printed circuit board 38, or another printed circuit board which is separate therefrom, controls the data transfer from the computer or computer network to which the present autoloader is connected for data archiving and backup. It is, of course, possible that the printed circuit boards 38 may be replaced by other circuit designs which perform the functions thereof.

Figure 2:
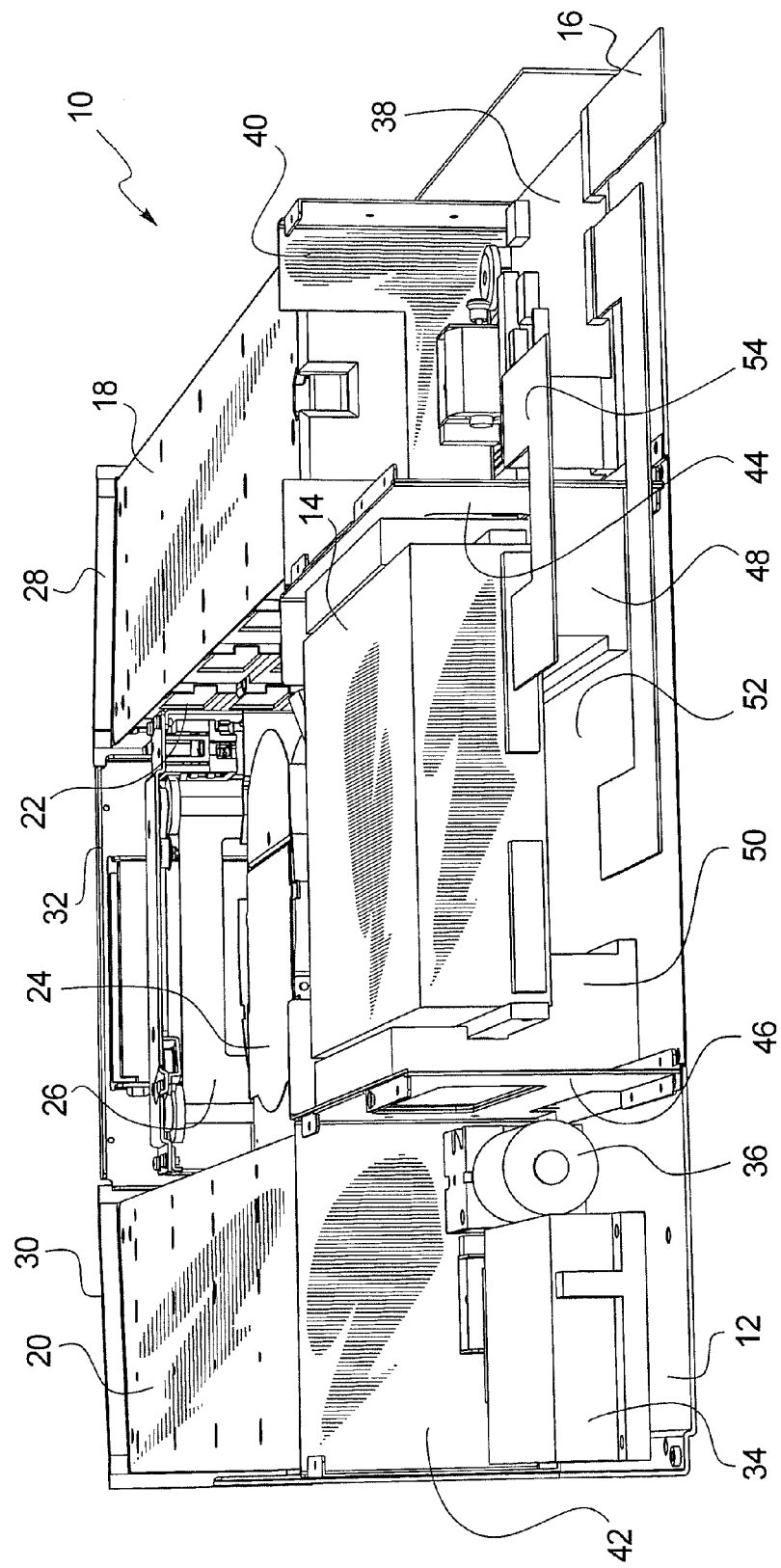
FIG. 2 is a back perspective view of the autoloader apparatus of FIG. 1 showing the space available for providing a hard disk.

Turning now to FIG. 2, the autoloader 10 is shown in a back view with a cover removed. The tape storage magazines 18 and 20 are provided on either side of the cartridge shuttle 26 for feeding the tape cartridges 22 to the tape drive 14. The motor 36 moves the cartridge shuttle 26 within the transfer space 24, as described above. As shown in further detail, the frame 12 includes transverse walls 40 and 42 which separate the cartridge storage magazines 18 and 20 from the printed circuit board area 38 and power supply area 34, respectively. The transverse walls 40 and 42 connect to longitudinal wall portions 44 and 46 between which is mounted the tape drive 14. In particular, support bracket elements 48 and 50 are provided between the longitudinal wall portions 44 and 46 and engage the opposite sides of the tape drive 14 to hold the tape drive 14 in place in a predetermined position so that the cartridge shuttle 26 may reliably transfer the tape cartridges 22 from and to the tape drive 14.

The support brackets 48 and 50 raise the tape drive 14 above the frame 12 so as to define a space 52 between the tape drive 14 and the frame 12. This space 52 is shaped to accept a computer hard disk. For instance, the space 52 may be of a size corresponding to one of the standard form factors for computer hard disks, such as a 5.25 inch form factor, 3.5 inch form factor or 2.5 inch form factor. Other form factors are also encompassed within the present invention, including PC cards, compact flash cards and other hard drive sizes.

The illustrated autoloader includes a space for mounting a single hard disk. However, it is envisioned that spaces may be provided within the autoloader apparatus for two or more hard disks. In such cases, the multiple hard disks may be used to expand the hard disk storage capacity, provide added reliability and/or provide additional back up speed.

Also visible in FIG. 2 is the tape drive cable 54 which connects between the tape drive 14 and the printed circuit boards 38. The operation and control of the tape drive 14 is carried out through data carried via the tape drive cable 54.

Figure 3:
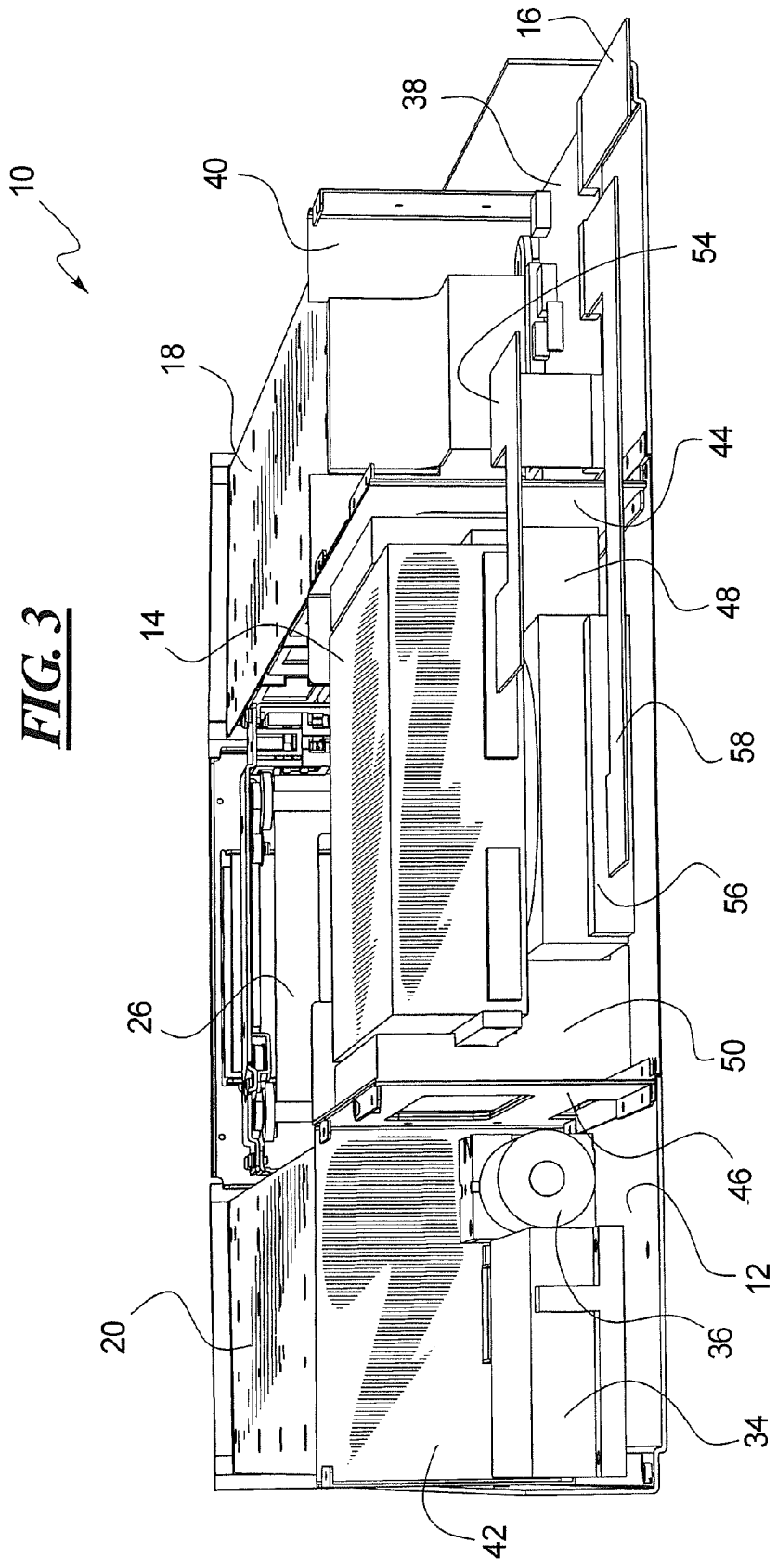
FIG. 3 is a back perspective view of the apparatus shown in FIG. 2 but including a hard disk inserted into the hard disk space.

In FIG. 3, the hard disk space 52 has been filled by a hard disk 56. Preferably, the hard disk 56 is mounted to the mounting portions 48 and 50 between the longitudinal wall portions 44 and 46. The hard disk 56 is connected to the printed circuit board 38 by a hard disk cable 58. Both the hard disk cable 58 and tape drive cable 54 are formed of ribbon cable and thereby provide both control and data transfer paths for operation of the respective devices and data transfer there between. A power supply connection is also made to the hard disk 56. Other cable types and connections are also encompassed within the present invention.

In the illustrated embodiment, the hard disk cable 58 is connected to a different portion of the printed circuit board than the tape drive cable 54. This different portion may be a separate printed circuit board or other controller unit or may be different portions of the same printed circuit board or controller unit.

Instead of the ribbon cable 58, the hard disk may be connected to a fixed data and control connection to provide for hot swapping of the hard disk 56 into and out of the autoloader apparatus 10. To facilitate such hot swapping, the housing 11 may include an access opening or access door to the hard disk slot or slots.

The printed circuit board 38 of the preferred embodiment runs according to the SCSI (Small Computer System Interface) standard. The data flow path is from and/or to the external host computer or network to the internal controller on the printed circuit board 38 and then to either the tape drive 14 or hard disk 56, or both. By transferring the data from the computer or computer network to the hard disk, the data transfer rate is increased and thus the time for effecting the transfer of the data to the archiving system is decreased. Preferably, the backup time is decreased sufficiently that the computer or network may be backed up while in full operation without a noticeable decrease in operating performance. The archived data, once on the hard disk 56, may be transferred internally within the autoloader apparatus to the tape cartridges through the tape drive 14. In systems requiring a higher capacity of data archiving capability, two or more hard disks may be provided in the autoloader apparatus in addition to the tape drive 14. It is also foreseeable that two or more tape drives may be provided in the system.

The hard disks can be installed into the back of the loader in any free slots by the user or may be provided already fixed in place as a pre-mounted drive in the loader when the device is supplied to the end user. The hard disks are connected to the autoloader interface by swap connectors or by a cable or by other means. In a backup situation, the data can first be transferred to the hard disks as a cache memory device prior to transfer of the data to tape cartridges.

The exemplary autoloader includes three dedicated areas within the autoloader housing; a power area, a storage engine area, and an external interface and printed circuit board area. The configuration of the present autoloader is in a standard form factor such as a 2U form factor which fits into standard computer mounting racks. Other form factors, such as a 1U, 3U or 4U form factor, are also envisioned.

By removing that hard disk from the autoloader, the autoloader may be used as a standard tape cartridge autoloader having only one or more tape drives. By mounting one or more hard disks into the device, the autoloader may be configured to cache the data being transferred between the tape cartridges and the host computer system or network onto the hard disks. Configuration of the hard disks by mounting in the present autoloader is a simple operation which can easily be done by an operator of a standard computer system. This is accomplished by mounting the hard disks in the dedicated hard disk slot of the present autoloader. In the illustrated example, the dedicated hard disk slot is underneath the tape drive, although other locations may be provided. The connection of the hard disk to the printed circuit board for control and data transfer is also readily accomplished by an operator of a standard computer system. Any number of hard disks and tape drive may be provided in combination in the autoloader.

Thus, there is shown and described a tape cartridge autoloader apparatus having a hard disk provided internally of the autoloader device. Enhanced transfer rates are provided between the autoloader and/or data backup library and the host computer or network. The backup window for effecting a backup of the data on the computer or network is minimize. The backup of the data may be done at a time which is convenient for the user, such as by copying the data onto the internal hard drive of the autoloader and then copying the data from the cache on the hard disk to the tape cartridges. The present hard disk can also be configured to hold the most recently used files of a user or to mirror the tape cartridge data.

It is also foreseeable to configure the hard disk as an internal RAID (Redundant Array of Inexpensive Disks) system.

References to a hard disk in the present application encompass various hard disk configurations and are not limited to the various interface types, capacities or form factors. Most hard disk units which are commercially available include a plurality of physical hard disks platters within a single hard disk unit. The preferred embodiment of the present invention envisions use of standard, readily available hard disk units having plural hard disk platters mounted within a housing.

The data storage magazines may be constructed according to co-pending U.S. Provisional Patent Application Ser. No. 60/516,542, filed Oct. 31, 2003, and to the non-provisional patent application claiming the benefit thereof, which is incorporated by reference herein.

The present device is scalable in accordance with the teachings of co-pending U.S. Provisional Patent Application Ser. No. 60/515,601, filed Oct. 30, 2003, and to the non-provisional patent application claiming the benefit thereof, which is incorporated by reference herein.

The cartridge shuttle may be constructed according to the teachings of co-pending U.S. Provisional Patent Application Ser. No. 60/515,738 filed Oct. 30, 2003, and to the non-provisional patent application claiming the benefit thereof; which is incorporated by reference herein.

Although other modifications and changes may be suggested by those skilled in the art, it is the intention of the inventors to embody within the patent warranted hereon all changes and modifications as reasonably and properly come within the scope of their contribution to the art.

I claim:

1. A method for data archiving, comprising the steps of:
    transferring data from a computer system or computer network to a hard disk in a data backup device;
    loading a tape cartridge from a cartridge storage magazine within said data backup device to a tape drive within said data backup device using an automated cartridge shuttle mounted and movable within said data backup device;
    transferring data from said hard disk within said data backup device to said tape cartridge in said tape drive;
    unloading said tape cartridge from said tape drive and returning said tape cartridge to said cartridge storage magazine using said automated cartridge shuttle; and
    transferring additional data from said hard disk to said further tape cartridge in said tape drive.

2. A method as claimed in claim 1, further comprising the step of:
    keeping a copy of the data transferred to the tape cartridges on the hard disk as a duplicate data copy.

* * * * *